March 9, 1954 H. A. BORTZ 2,671,319
REFRIGERATED STORAGE AND DISPLAY CABINET
Filed March 16, 1950 3 Sheets-Sheet 1
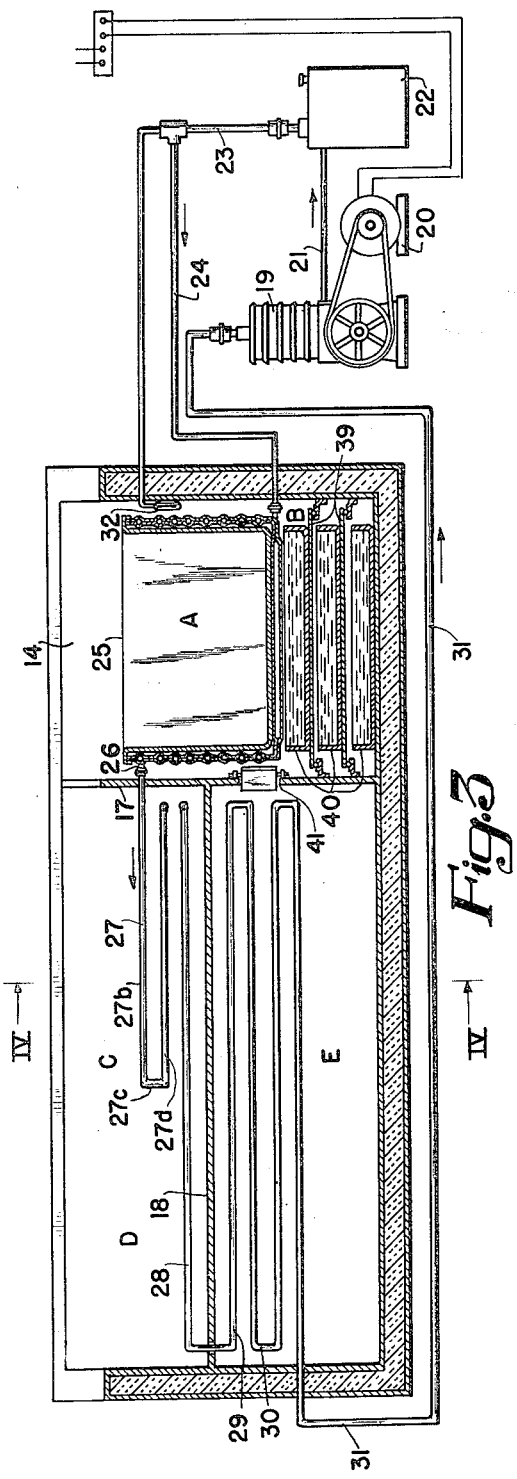
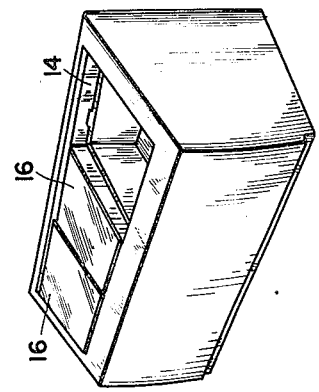
Fig. 2
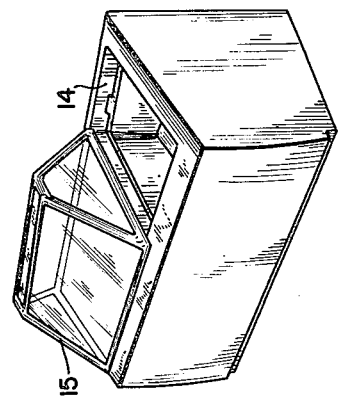
Fig. 1
INVENTOR.
Harry A. Bortz
BY
HIS ATTORNEYS INVENTOR.
Harry A. Bortz
BY
HIS ATTORNEYS

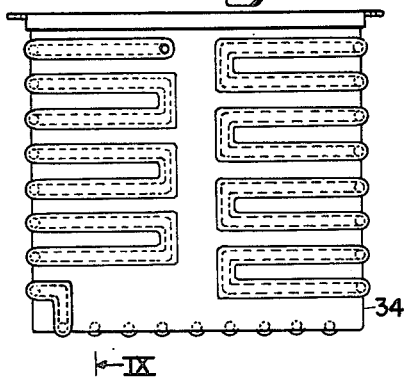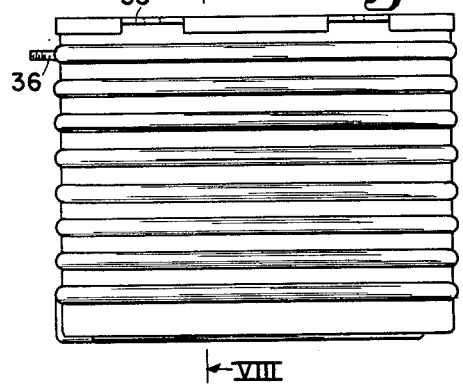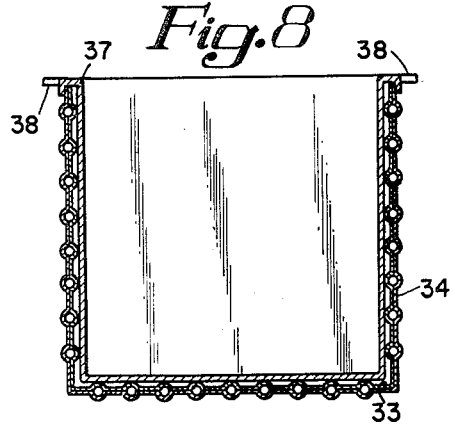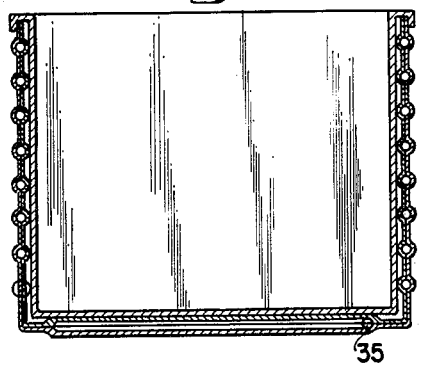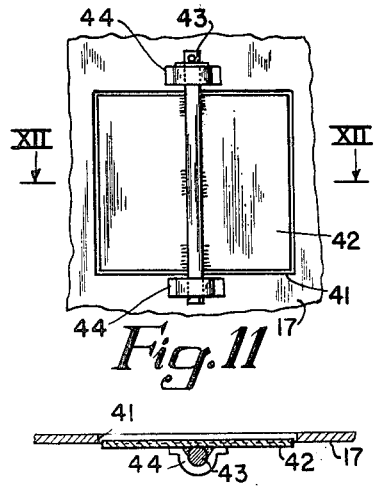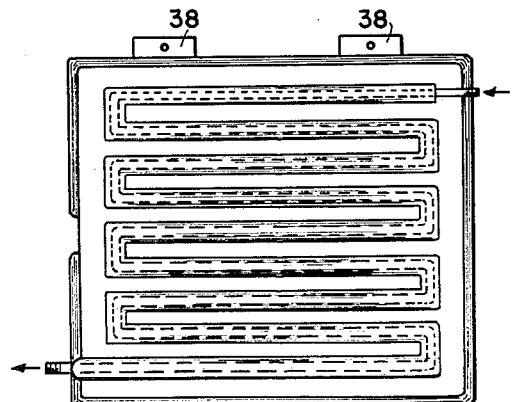

Patented Mar. 9, 1954

2,671,319

UNITED STATES PATENT OFFICE 2,671,319

REFRIGERATED STORAGE AND DISPLAY CABINET

Harry A. Bortz, Pittsburgh, Pa.

Application March 16, 1950, Serial No. 150,071

5 Claims. (Cl. 62—89.5)

This application relates to a storage and display cabinet, particularly a cabinet for the storage and display of fish and poultry in retail stores.

Fish is now sold in several forms, for example, as fresh fish or "round fish," or in precleaned, cut and packaged form or in frozen form. Poultry is likewise sold in several forms.

For storage and display purposes the fish and poultry must be kept at a different temperature depending upon the form in which the fish is sold. For example, fresh fish which is precleaned, cut and packaged is kept in a temperature range of around 33° F. Fresh fish is kept at a temperature of approximately 38° F. and frozen fish is kept at a temperature of 0 to 5° F. In most retail stores it is not practical to install and maintain a separate cabinet and a separate refrigerating unit for each temperature range. For small stores this is prohibitively expensive. I have invented a storage and display cabinet which is divided into compartments for storage, display, and both storage and display. Each compartment may be maintained at a temperature different from the temperature in the other compartments. In addition two different temperature zones can be maintained in one compartment. Of particular importance both from the viewpoint of original cost and from the cost of maintenance, all of the compartments are cooled by one source of refrigerant regulated by one temperature control device.

In the accompanying drawings I have shown a present preferred embodiment of my invention in which—

Figure 1 is an isometric view of one form of my cabinet;

Figure 2 is an isometric view of another form of my cabinet;

Figure 3 is a central longitudinal section of the cabinet shown in Figures 1 and 2 except that the cover shown in Figure 1 is omitted;

Figure 6 is a front elevation of a cooling unit which is used in my cabinet;

Figure 7 is a side elevation of the cooling unit shown in Figure 6;

Figure 8 is a section along the lines VIII—VIII of Figure 7;

Figure 9 is a section along the lines IX—IX of Figure 6;

Figure 10 is a plan view of the liner shown in Figures 6 to 9, inclusive;

Figure 11 is an elevation view of a temperature regulator which I use in my cabinet; and Figure 12 is a section along the lines XII—XII of Figure 11.

My storage and display cabinet has the same general size and shape of display cabinets that are generally found in retail stores. As shown in Figures 1 and 2, it is rectangular with a sloping top, a portion 14 of which is always open. The balance of the top may be closed by a glass frame 15 (Figure 1) or by sliding doors 16 (Figure 2).

Figure 3 shows how my cabinet is divided into several compartments and the means for cooling the several compartments. In this figure I have also indicated the different temperature zones in the compartments by letters A to E, inclusive. In zone A frozen fish and poultry are stored and since the top is open they are available for inspection and sale. The temperature in zone A is maintained between 0 and 5° F. The temperature in zone B is maintained at approximately 10° F. This zone can be used for storage or it can be used to make ice which is used for the display of fresh fish. Zone C is maintained at approximately 33° F. and is used for the storage and display of fresh fish which has been precleaned, cut and packaged. Zone D is maintained at a temperature of approximately 38° F. and is used for the storage on ice of round fresh fish. Zone E is maintained at a temperature of 34 to 38° F. and is used for the storage of fresh fish and poultry or whatever else requires that temperature range for safe keeping.

Figure 5:
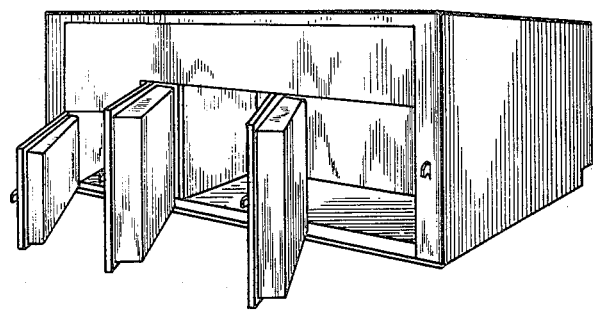
Figure 5 is an isometric view showing the rear side of the cabinet shown in Figure 2.

While five temperature zones have been described above it will be noted from Figure 3 of the drawings that the cabinet is actually divided into only three compartments. This is accomplished by a vertical partition 17 spaced about one-third of the way along the cabinet from one end and extending the full width and heighth of the cabinet. Two additional compartments are formed by a horizontal partition 18 which extends the full width of the cabinet and from the partition 17 to the opposite end of the cabinet. It will be noted from Figure 3 that the compartment formed by the walls of the cabinet and the vertical partition only has two temperature zones, A and B, and also that the upper of the two compartments formed by the walls of the cabinet and by both the vertical and horizontal partitions has two temperature zones, C and D. Access to the several compartments can be had through the top of my cabinet and also as shown in Figure 5 by doors in the rear wall of the cabinet.

To maintain the various temperature zones just described I provide a conventional source of liquid refrigerant which may include a compressor 19 driven by an electric motor 20. The compressor forces refrigerant through the pipe 21 to a reservoir 22. The liquid refrigerant flows from the reservoir 22 through pipes 23 and 24 to a cooling liner 25 which is of standard construction. After passing through the liner, the refrigerant flows through the pipe 26 through coils 27 and 28 and then through coils 29 and 30 then through a return pipe 31 to the compressor 19. A conventional thermostatic regulator 32 controls the operation of the compressor.

Figures 6 to 10, inclusive, show the construction of the liner 25 which is installed in the compartment formed by the vertical partition 17 and at one end of the cabinet. In essence the liner is formed from two metal sheets 33 and 34 which have a series of parallel semi-circular channels stamped therein. The channels are formed in the two sheets in opposite directions so that as shown in Figures 8 and 9 the two sheets may be placed one inside the other so that the semi-circular channels of one sheet are opposite the channels on the other sheet. The two sheets are then welded to each other in the places between the semi-circular channels to form a continuous closed pipe through which liquid refrigerant may flow and partially expand. As will appear from a study of Figures 6 and 7 the pipe formed by welding the sheets 33 and 34 together provides a continuous closed path across the bottom and around four sides from an inlet 35 (Figure 9) to an outlet 36 (Figure 7). A metal box 37 is fitted inside the plates 33 and 34 to form a container for the storage and display of frozen fish and poultry. The metal box 37 has ears 38 (Figure 10) by which the cooling liner can be held in position in the compartment formed by the vertical partition and one end of the cabinet. As is shown in Figure 3 the cooling liner is spaced from the walls of the cabinet and from the partition 17 so that air may flow past the outside of the liner down below the liner to temperature zone B. If the temperature of zone A is maintained at from 0 to 5° F., zone B will be kept at approximately 5 to 10° F. Zone B can be used for additional storage or it can be provided with shelves 39 on which ice trays 40 can be placed.

Figure 4:
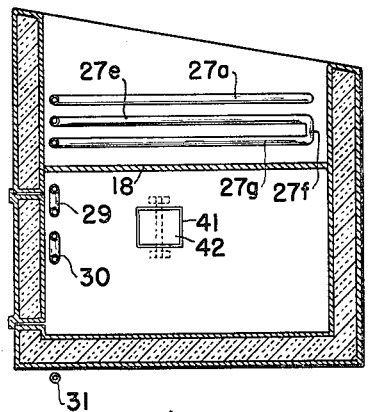
Figure 4 is a section along the lines IV—IV of Figure 3.

As appears from Figures 3 and 4 the refrigerating coil 27 extends from the pipe 26, first parallel to the partition 17 as at 27a (Figure 4) then along the rear wall of the cabinet as at 27b (Figure 3). It forms a loop 27c and returns along the rear wall as at 27d. It next runs parallel to the partition 17 as at 27e (Figure 4) forming a loop 27f and returning to the rear wall as at 27g where it joins the coil 28. It will be noted that the coil 27 extends approximately one-half of the distance along the rear wall of the cabinet in the compartment formed by the vertical and horizontal partitions. The result is that zone C is maintained at a lower temperature than zone D. When fish and poultry are displayed in the upper compartment having temperature zones C and D, a layer of crushed ice can be placed on the partition 18 on which the fish and poultry can be placed.

From coil 28 the liquid refrigerant flows through coils 29 and 30 which are in the lower compartment formed by the vertical and horizontal partitions. As shown in Figure 4 these coils extend along the rear wall of the cabinet and as shown in Figure 3 they extend substantially the full length of the lower compartment formed by the vertical and horizontal partitions.

As stated above, the temperature of zone E is generally 34 to 38° F. It may, however, be desirable to maintain this zone at a lower temperature in order to supply additional low temperature storage space. To lower the temperature in this zone, I provide an opening 41 in the vertical partition 17. Air between the cooling liner 25 and the partition 17 which is cooled by the liner 25 will flow through the opening 41 into temperature zone E. I control the flow of air through the opening 41 by a damper 42 which is centrally mounted on a pin 43 which in turn is held to the partition 17 by straps 44. Turning the damper 42 will, of course, vary the size of the opening 41.

While I have described certain present preferred embodiments of my invention, it is to be understood that it may be otherwise embodied within the scope of the following claims.

I claim:

1. A storage and display cabinet having a vertical partition extending the full width and heighth of the cabinet, a horizontal partition extending the width of the cabinet and longitudinally from the vertical partition to one end of the cabinet, the partitions thus dividing the cabinet into three compartments, a refrigerant expansion coil adjacent the top of the compartment formed by the walls of the cabinet with the vertical partition only, a second expansion coil in the upper compartment formed by the two partitions and the walls of the cabinet, a portion of said second mentioned coil extending along one side of the compartment and another portion extending substantially the full length of the compartment and a third portion extending less than the full distance lengthwise of said compartment whereby to provide two different temperature zones in said compartment, a third expansion coil in the lower compartment formed by said partitions, and a source of liquid refrigerant, said coils being connected in series with each other and with said source.

2. A storage and display cabinet having a vertical partition extending the full width and heighth of the cabinet, a horizontal partition extending the width of the cabinet and longitudinally from the vertical partition to one end of the cabinet, the partitions thus dividing the cabinet into three compartments, a refrigerant expansion coil in the upper half of the compartment formed by the vertical partition and the sides and another end of the cabinet whereby the upper and lower halves of said compartment may be maintained at different temperatures, a refrigerant expansion coil in the compartments formed by the two partitions and the sides and the first mentioned end wall of the cabinet, the coils being of different lengths whereby said compartments may be maintained at different temperatures, said coils also being connected in series with each other and with a source of refrigerant, and an adjustable opening in said vertical partition whereby a flow of air between compartments on each side of the partition can be obtained and controlled.

3. A storage and display cabinet having a vertical partition extending the full width and heighth of the cabinet, a horizontal partition extending the width of the cabinet and longitudinally from the vertical partition to one end of the cabinet, the partitions thus dividing the cabinet into three compartments, a refrigerant expansion coil in the upper half of the compartment formed by the vertical partition and the sides and another end of the cabinet whereby the upper and lower halves of said compartment may be maintained at different temperatures, a refrigerant expansion coil in the compartments formed by the two partitions and the sides and the first mentioned end wall of the cabinet, the coils being of different lengths whereby said compartments may be maintained at different temperatures, said coils also being connected in series with each other and with a source of refrigerant and a framed glass top adapted to cover the upper compartment formed by the vertical and horizontal partitions.

4. A storage and display cabinet having a vertical partition extending the full width and heighth of the cabinet, a horizontal partition extending the width of the cabinet and longitudinally from the vertical partition to one end of the cabinet, the partitions thus dividing the cabinet into three compartments, a refrigerant expansion coil in the upper half of the compartment formed by the vertical partition and the sides and another end of the cabinet whereby the upper and lower halves of said compartment may be maintained at different temperatures, a refrigerant expansion coil in the compartments formed by the two partitions and the sides and the first mentioned end wall of the cabinet, the coil having portions of different length whereby said compartments may be maintained at different temperatures, said coils also being connected in series with each other and with a source of refrigerant, the expansion coil in the compartment formed by the walls of the cabinet with the vertical partition only comprising a cooling liner positioned in the upper portion of the compartment, the cooling liner being in the form of a hollow rectangle in which articles may be stored at low temperature.

5. A storage and display cabinet having a vertical partition extending the full width and height of the cabinet, a horizontal partition extending the width of the cabinet and longitudinally from the vertical partition to one end of the cabinet, the partitions thus dividing the cabinet into three compartments, a refrigerant expansion coil in the upper half of the compartment formed by the vertical partition and the sides and another end of the cabinet whereby the upper and lower halves of said compartment may be maintained at different temperatures, a refrigerant expansion coil in the compartments formed by the two partitions and the sides and the first mentioned end wall of the cabinet, the coil having portions of different length whereby said compartments may be maintained at different temperatures, said coils also being connected in series with each other and with a source of refrigerant, the expansion coil in the compartment formed by the walls of the cabinet with the vertical partition only comprising a cooling liner positioned in the upper portion of the compartment, the walls of the liner being placed adjacent to but spaced from the sides of the compartment whereby air cooled by the liner may flow into the lower portion of the compartment.

HARRY A. BORTZ.

References Cited in the file of this patent

UNITED STATES PATENTS

| Number | Name | Date |
|---|---|---|
| 633,206 | Miles | Sept. 19, 1899 |
| 1,014,833 | Marshall | Jan. 16, 1912 |
| 1,337,696 | Ewen | Apr. 20, 1920 |
| 1,467,246 | Hilger | Sept. 4, 1923 |
| 1,728,804 | Rayfield | Sept. 17, 1929 |
| 1,833,300 | Peck | Nov. 24, 1931 |
| 1,881,541 | Harrison | Oct. 11, 1932 |
| 2,032,234 | Thomas | Feb. 25, 1936 |
| 2,125,444 | Holderle | Aug. 2, 1938 |
| 2,133,958 | Kalischer | Oct. 25, 1938 |
| 2,437,257 | Johnson | Mar. 9, 1948 |
| 2,462,279 | Passman | Feb. 22, 1949 |
| 2,477,393 | Skoog | July 26, 1949 |
| 2,481,790 | Spire | Sept. 13, 1949 |
| 2,497,734 | Kuklich | Feb. 14, 1950 |